(12) United States Patent
Conrad

(10) Patent No.: US 12,326,151 B2
(45) Date of Patent: Jun. 10, 2025

(54) FAN AND MOTOR ASSEMBLY FOR AN APPLIANCE SUCH AS A VACUUM CLEANER AND A VACUUM CLEANER HAVING SAME

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 18/499,939

(22) Filed: Nov. 1, 2023

(65) Prior Publication Data

US 2024/0060495 A1    Feb. 22, 2024

Related U.S. Application Data

(63) Continuation of application No. 17/178,030, filed on Feb. 17, 2021, now Pat. No. 11,841,024.

(51) Int. Cl.
*F04D 19/00*     (2006.01)
*F04D 13/02*     (2006.01)
(Continued)

(52) U.S. Cl.
CPC .......... *F04D 19/007* (2013.01); *F04D 13/026* (2013.01); *F04D 13/027* (2013.01); *F04D 19/002* (2013.01); *F04D 25/026* (2013.01); *F04D 25/0613* (2013.01); *F04D 25/0653* (2013.01); *F04D 25/0693* (2013.01); *F04D 25/166* (2013.01); *F04D 29/043* (2013.01);
(Continued)

(58) Field of Classification Search
CPC .. F04D 13/027; F04D 25/0613; F04D 25/026; F04D 13/024; F04D 19/007; F04D 19/002; F04D 13/026; H02K 16/00; H02K 16/02; H02K 51/00; H02K 7/14; H02K 5/128; H02K 49/106; H02K 21/24; H02K 16/025; H02K 49/104
See application file for complete search history.

(56) References Cited

U.S. PATENT DOCUMENTS 2,436,939 A    3/1948    Schug
3,950,686 A    4/1976    Randall
(Continued)

FOREIGN PATENT DOCUMENTS

CA    2275675 A1    12/1999
CA    2288544 A1    5/2000
(Continued)

OTHER PUBLICATIONS

U.S. Appl. No. 09/343,479, filed Jun. 30, 1999.

*Primary Examiner* — Peter J Bertheaud
(74) *Attorney, Agent, or Firm* — Philip C. Mendes da Costa; SMART & BIGGAR LP

(57) ABSTRACT

A fan assembly comprising a plurality of nested components comprising a first stator; a first rotor that is radially spaced from the first stator, wherein the first rotor is magnetically driven by the first stator, the first rotor includes a second stator whereby the second stator rotates with the first rotor; a second rotor that is radially spaced from the second stator, wherein the second rotor is magnetically driven by the second stator; and, a fan blade drivenly connected to the second rotor.

18 Claims, 7 Drawing Sheets

(51) Int. Cl.

| | | |
|---|---|---|
| *F04D 25/02* | (2006.01) | |
| *F04D 25/06* | (2006.01) | |
| *F04D 25/16* | (2006.01) | |
| *F04D 29/043* | (2006.01) | |
| *H02K 7/14* | (2006.01) | |
| *H02K 16/00* | (2006.01) | |
| *H02K 16/02* | (2006.01) | |
| *H02K 21/24* | (2006.01) | |
| *H02K 49/10* | (2006.01) | |
| *H02P 5/48* | (2016.01) | |

(52) U.S. Cl.
CPC ............... *H02K 7/14* (2013.01); *H02K 16/00* (2013.01); *H02K 16/02* (2013.01); *H02K 16/025* (2013.01); *H02K 21/24* (2013.01); *H02K 49/106* (2013.01); *H02K 49/108* (2013.01); *F04D 13/025* (2013.01); *H02P 5/48* (2013.01)

(56) References Cited

U.S. PATENT DOCUMENTS

| | | | |
|---|---|---|---|
| 4,373,147 A * | 2/1983 | Carlson, Jr. ......... | H02K 16/025 |
| | | | 318/659 |
| 5,267,371 A | 12/1993 | Soler et al. | |
| 5,358,290 A | 10/1994 | Fleet et al. | |
| 5,974,625 A | 11/1999 | Garner | |
| 6,098,244 A | 8/2000 | Conrad et al. | |
| 6,099,661 A | 8/2000 | Conrad | |
| 6,101,672 A | 8/2000 | Conrad et al. | |
| 6,123,779 A | 9/2000 | Conrad et al. | |
| 6,129,775 A | 10/2000 | Conrad et al. | |
| 6,135,708 A | 10/2000 | Conrad et al. | |
| 6,168,716 B1 | 1/2001 | Conrad et al. | |
| 6,170,119 B1 | 1/2001 | Conrad et al. | |
| 6,173,474 B1 | 1/2001 | Conrad | |
| 6,174,127 B1 | 1/2001 | Conrad et al. | |
| 6,183,641 B1 | 2/2001 | Conrad et al. | |
| 6,224,325 B1 | 5/2001 | Conrad et al. | |
| 6,231,645 B1 | 5/2001 | Conrad et al. | |
| 6,238,177 B1 | 5/2001 | Conrad et al. | |
| 6,243,917 B1 | 6/2001 | Conrad | |
| 6,251,296 B1 | 6/2001 | Conrad et al. | |
| 6,261,052 B1 | 7/2001 | Conrad et al. | |
| 6,261,379 B1 | 7/2001 | Conrad et al. | |
| 6,280,143 B1 | 8/2001 | Parker et al. | |
| 6,307,358 B1 | 10/2001 | Conrad | |
| 6,312,594 B1 | 11/2001 | Conrad et al. | |
| 6,328,527 B1 | 12/2001 | Conrad et al. | |
| 6,334,234 B1 | 1/2002 | Conrad et al. | |
| 6,344,064 B1 | 2/2002 | Conrad | |
| 6,417,591 B1 | 7/2002 | Saito et al. | |
| 6,440,197 B1 | 8/2002 | Conrad et al. | |
| 6,457,205 B1 | 10/2002 | Conrad | |
| 6,533,834 B2 | 3/2003 | Conrad et al. | |
| 6,599,340 B2 | 7/2003 | Conrad et al. | |
| 6,782,585 B1 | 8/2004 | Conrad et al. | |
| 7,078,844 B2 | 7/2006 | Chang et al. | |
| 7,329,294 B2 | 2/2008 | Conrad | |
| 7,740,675 B2 | 6/2010 | Conrad | |
| 7,749,293 B2 | 7/2010 | Conrad | |
| 7,776,120 B2 | 8/2010 | Conrad | |
| 7,803,207 B2 | 9/2010 | Conrad | |
| 7,811,345 B2 | 10/2010 | Conrad | |
| 7,867,308 B2 | 1/2011 | Conrad | |
| 7,941,895 B2 | 5/2011 | Conrad | |
| 8,127,398 B2 | 3/2012 | Conrad | |
| 8,146,201 B2 | 4/2012 | Conrad | |
| 8,151,407 B2 | 4/2012 | Conrad | |
| 8,176,596 B2 | 5/2012 | Conrad | |
| 8,192,515 B2 | 6/2012 | Conrad | |
| 8,292,979 B2 | 10/2012 | Conrad | |
| 8,296,900 B2 | 10/2012 | Conrad | |
| 8,333,666 B2 | 12/2012 | Ekberg et al. | |
| 8,349,428 B2 | 1/2013 | Conrad | |
| 8,370,993 B2 | 2/2013 | Conrad | |
| 8,375,508 B2 | 2/2013 | Conrad | |
| 8,448,291 B2 | 5/2013 | Conrad | |
| 8,479,358 B2 | 7/2013 | Conrad | |
| 8,486,170 B2 | 7/2013 | Conrad et al. | |
| 8,510,907 B2 | 8/2013 | Conrad | |
| 8,533,904 B2 | 9/2013 | Conrad | |
| 8,561,257 B2 | 10/2013 | Conrad | |
| 8,567,005 B2 | 10/2013 | Conrad | |
| 8,578,550 B2 | 11/2013 | Conrad | |
| 8,578,553 B2 | 11/2013 | Conrad | |
| 8,590,102 B2 | 11/2013 | Conrad | |
| 8,593,019 B2 | 11/2013 | Chung et al. | |
| 8,607,407 B2 | 12/2013 | Conrad | |
| 8,621,709 B2 | 1/2014 | Conrad | |
| 8,640,304 B2 | 2/2014 | Conrad | |
| 8,646,147 B2 | 2/2014 | Conrad | |
| 8,659,184 B2 | 2/2014 | Conrad | |
| 8,677,554 B2 | 3/2014 | Conrad | |
| 8,677,558 B2 | 3/2014 | Conrad | |
| 8,713,751 B2 | 5/2014 | Conrad | |
| 8,813,305 B2 | 8/2014 | Conrad | |
| 8,834,209 B2 | 9/2014 | Conrad | |
| 8,869,344 B2 | 10/2014 | Conrad | |
| 8,869,345 B2 | 10/2014 | Conrad | |
| 8,869,348 B2 | 10/2014 | Conrad | |
| 8,875,340 B2 | 11/2014 | Conrad | |
| 8,875,342 B2 | 11/2014 | Conrad | |
| 8,950,529 B2 | 2/2015 | Ross | |
| 9,027,198 B2 | 5/2015 | Conrad | |
| 9,027,203 B2 | 5/2015 | Conrad et al. | |
| 9,066,642 B2 | 6/2015 | Conrad | |
| 9,119,513 B2 | 9/2015 | Conrad | |
| 9,161,666 B2 | 10/2015 | Conrad | |
| 9,161,669 B2 | 10/2015 | Conrad | |
| 9,167,944 B2 | 10/2015 | Conrad | |
| 9,204,769 B2 | 12/2015 | Conrad | |
| 9,204,773 B2 | 12/2015 | Conrad | |
| 9,215,960 B2 | 12/2015 | Conrad | |
| 9,226,633 B2 | 1/2016 | Conrad et al. | |
| 9,227,151 B2 | 1/2016 | Conrad | |
| 9,227,201 B2 | 1/2016 | Conrad | |
| 9,232,881 B2 | 1/2016 | Conrad | |
| 9,238,235 B2 | 1/2016 | Conrad | |
| 9,295,995 B2 | 3/2016 | Conrad | |
| 9,314,138 B2 | 4/2016 | Conrad | |
| 9,314,139 B2 | 4/2016 | Conrad et al. | |
| 9,320,401 B2 | 4/2016 | Conrad | |
| 9,326,652 B2 | 5/2016 | Conrad | |
| 9,364,127 B2 | 6/2016 | Conrad | |
| 9,427,122 B2 | 8/2016 | Conrad et al. | |
| 9,427,126 B2 | 8/2016 | Conrad | |
| 9,433,332 B2 | 9/2016 | Conrad | |
| 9,451,852 B2 | 9/2016 | Conrad | |
| 9,451,855 B2 | 9/2016 | Conrad | |
| 9,456,721 B2 | 10/2016 | Conrad | |
| 9,492,045 B2 | 11/2016 | Conrad | |
| 9,526,394 B2 | 12/2016 | Conrad | |
| 9,572,463 B2 | 2/2017 | Conrad | |
| 9,591,952 B2 | 3/2017 | Conrad | |
| 9,591,958 B2 | 3/2017 | Conrad | |
| 9,775,484 B2 | 10/2017 | Conrad | |
| 9,801,513 B2 | 10/2017 | Conrad et al. | |
| 9,820,621 B2 | 11/2017 | Conrad et al. | |
| 10,076,183 B2 | 9/2018 | Conrad et al. | |
| 10,149,587 B2 | 12/2018 | Conrad et al. | |
| 10,159,393 B2 | 12/2018 | Conrad | |
| 10,201,260 B2 | 2/2019 | Conrad et al. | |
| 10,214,349 B2 | 2/2019 | Conrad | |
| 10,251,519 B2 | 4/2019 | Conrad | |
| 10,357,136 B2 | 7/2019 | Conrad | |
| 10,537,216 B2 | 1/2020 | Conrad | |
| 10,537,219 B2 | 1/2020 | Conrad et al. | |
| 10,568,477 B2 | 2/2020 | Conrad | |
| 10,575,693 B2 | 3/2020 | Conrad | |
| 10,667,663 B2 | 6/2020 | Conrad | |
| 10,687,679 B2 | 6/2020 | Conrad et al. | |
| 10,729,294 B2 | 8/2020 | Conrad et al. | |

(56) References Cited

U.S. PATENT DOCUMENTS

| | | |
|---|---|---|
| 10,791,890 B2 | 10/2020 | Conrad |
| 10,791,896 B2 | 10/2020 | Conrad |
| 10,888,205 B2 | 1/2021 | Conrad et al. |
| 10,932,634 B2 | 3/2021 | Conrad |
| 10,959,588 B2 | 3/2021 | Conrad et al. |
| 11,013,378 B2 | 5/2021 | Conrad |
| 11,108,254 B2 | 8/2021 | Conrad |
| 11,135,602 B2 | 10/2021 | Conrad |
| 11,154,169 B2 | 10/2021 | Conrad |
| 11,198,085 B2 | 12/2021 | Conrad et al. |
| 11,213,179 B2 | 1/2022 | Conrad |
| 11,246,462 B2 | 2/2022 | Conrad |
| 11,285,495 B2 | 3/2022 | Conrad |
| 11,318,482 B2 | 5/2022 | Conrad |
| 11,478,116 B2 | 10/2022 | Conrad |
| 11,478,117 B2 | 10/2022 | Conrad et al. |
| 11,529,034 B2 | 12/2022 | Conrad |
| 11,534,041 B2 | 12/2022 | Conrad |
| 11,534,043 B2 | 12/2022 | Conrad |
| 11,534,702 B2 | 12/2022 | Conrad |
| 11,547,258 B2 | 1/2023 | Conrad |
| 11,571,097 B2 | 2/2023 | Conrad |
| 11,612,290 B2 | 3/2023 | Conrad |
| 11,737,625 B2 | 8/2023 | Conrad |
| 11,745,131 B2 | 9/2023 | Conrad |
| 11,793,374 B2 | 10/2023 | Conrad |
| 11,839,343 B2 | 12/2023 | Conrad et al. |
| 11,857,142 B2 | 1/2024 | Conrad |
| 11,950,745 B2 | 4/2024 | Conrad et al. |
| 2001/0027587 A1 | 10/2001 | Conrad et al. |
| 2002/0162188 A1 | 11/2002 | Harmen |
| 2003/0102751 A1 | 6/2003 | Bryant |
| 2003/0201754 A1 | 10/2003 | Conrad |
| 2004/0216266 A1 | 11/2004 | Conrad |
| 2006/0196004 A1 | 9/2006 | Conrad |
| 2008/0172992 A1 | 7/2008 | Conrad |
| 2008/0178416 A1 | 7/2008 | Conrad |
| 2008/0178418 A1 | 7/2008 | Conrad |
| 2008/0179133 A1 | 7/2008 | Conrad |
| 2008/0196366 A1 | 8/2008 | Conrad |
| 2008/0216281 A1 | 9/2008 | Conrad |
| 2010/0175217 A1 | 7/2010 | Conrad |
| 2010/0229323 A1 | 9/2010 | Conrad |
| 2010/0229325 A1 | 9/2010 | Conrad |
| 2010/0229326 A1 | 9/2010 | Conrad |
| 2010/0229334 A1 | 9/2010 | Conrad |
| 2010/0229335 A1 | 9/2010 | Conrad |
| 2010/0251507 A1 | 10/2010 | Conrad |
| 2011/0219567 A1 | 9/2011 | Conrad |
| 2011/0219579 A1 | 9/2011 | Conrad |
| 2014/0237768 A1 | 8/2014 | Conrad |
| 2017/0040920 A1 | 2/2017 | Bailey et al. |
| 2020/0305671 A1 | 10/2020 | Conrad |
| 2021/0228032 A1 | 7/2021 | Conrad |
| 2021/0330157 A1 | 10/2021 | Conrad |
| 2021/0386258 A1 | 12/2021 | Conrad |
| 2022/0142440 A1 | 5/2022 | Conrad |
| 2022/0151446 A1 | 5/2022 | Conrad et al. |
| 2023/0098664 A1 | 3/2023 | Conrad |
| 2023/0263350 A1 | 8/2023 | Conrad et al. |
| 2023/0348169 A1 | 11/2023 | Conrad |
| 2024/0016351 A1 | 1/2024 | Conrad |
| 2024/0138634 A1 | 5/2024 | Conrad |
| 2024/0180373 A1 | 6/2024 | Conrad et al. |
| 2024/0358212 A1 | 10/2024 | Conrad |

FOREIGN PATENT DOCUMENTS

| | | |
|---|---|---|
| CA | 2258416 A1 | 7/2000 |
| CA | 2258419 A1 | 7/2000 |
| CA | 2258421 A1 | 7/2000 |
| CA | 2258422 A1 | 7/2000 |
| CA | 2258423 A1 | 7/2000 |
| CA | 2258426 A1 | 7/2000 |
| CA | 2330801 A1 | 7/2001 |
| CA | 2338193 A1 | 7/2002 |
| CA | 2339514 A1 | 9/2002 |
| CA | 2342673 A1 | 9/2002 |
| CA | 2342993 A1 | 9/2002 |
| CA | 2658014 A1 | 9/2010 |
| CA | 2658022 A1 | 9/2010 |
| CA | 2658160 A1 | 9/2010 |
| CA | 2658366 A1 | 9/2010 |
| CA | 2658397 A1 | 9/2010 |
| CA | 2658497 A1 | 9/2010 |
| CA | 2658643 A1 | 9/2010 |
| CA | 2658644 A1 | 9/2010 |
| WO | 0010718 A1 | 3/2000 |

\* cited by examiner

FAN AND MOTOR ASSEMBLY FOR AN APPLIANCE SUCH AS A VACUUM CLEANER AND A VACUUM CLEANER HAVING SAME

CROSS-REFERENCE TO RELATED APPLICATIONS

This application is a continuation of co-pending U.S. patent application Ser. No. 17/178,030, filed on Feb. 17, 2021, now allowed, the entirety of which is hereby incorporated by reference.

FIELD

This disclosure relates generally to fan and motor assemblies for use in appliances and, optionally, in portable appliances such as surface cleaning apparatuses, room air cleaners, hair dryers, and hand dryers.

INTRODUCTION

The following is not an admission that anything discussed below is part of the prior art or part of the common general knowledge of a person skilled in the art.

Various types of fan and motor assemblies for use in portable, lower power appliances are known. For example, fan and motor assemblies are commonly found in products such as corded and cordless vacuum cleaners, carpet extractors, hair dryers, hand dryers, and room air cleaners/purifiers. In these appliances, the fan and motor assembly comprise one rotor and one stator that drive an output shaft.

Fan and motor assemblies that are commonly found in appliances are generally optimized for one rotational fan speed, dB level (i.e., quietness), size, and use (i.e., high suction or high air flow), or are designed such that all characteristics are balanced. For example, appliances may give up rotational fan speed for a particular dB level or may give up rotational fan speed for overall size of the appliance.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In one aspect of this disclosure, which may be used by itself or with one or more of the other aspects disclosed herein, there is provided a fan assembly, which may be used within an appliance, that may comprise at least first and second connected motors. Connecting multiple motors, as opposed to utilizing one motor, can allow for increased fan speeds with relatively decreased dB level as well as a decrease in the size (specifically the diameter) of the fan assembly. Accordingly, the output shaft of one motor may be drivingly connected to a second motor. For example, the rotor of one motor may be drivingly connected to the stator of a second motor. Therefore, the rotation produced by the first motor causes the stator of the second motor to rotate. The rotation induced to the rotor of the second motor is therefore essentially added to the rotation produced by the first motor.

In other aspects, connected motors can allow for a single fan assembly to have multiple configurations, each providing unique flow characteristics (e.g., higher flow or higher suction) when used in appliances and, in particular, an appliance such as a portable appliance.

In one aspect of this disclosure, which may be used by itself of with one or more of the other aspects disclosed herein, there is provided an appliance having an air flow passage and a fan assembly provided in the air flow passage, the fan assembly comprising:
  (a) a first motor comprising a first rotor, a first stator, and a first rotatable output shaft drivingly connected to the first rotor;
  (b) a second motor comprising a second rotor, a second stator, and a second rotatable output shaft drivingly connected to the second rotor, wherein the first rotatable output shaft is driving connected to the second stator; and
  (c) a fan blade drivingly connected to the second rotatable output shaft.

In any embodiment, the first and second motors may be nested.

In any embodiment, the first rotatable output shaft may have a longitudinal axis and the second motor may be axially spaced from the first motor.

In any embodiment, the second stator may be fixedly mounted to the first rotatable output shaft.

In any embodiment, the second stator may be disengageable from the first rotatable output shaft. Optionally, a second fan blade may be drivingly connected to the first rotatable output shaft.

In any embodiment, the appliance may comprise one of a surface cleaning apparatus, a room air cleaner, a hair dryer or a hand dryer.

In any embodiment, the appliance may be portable.

In any embodiment:
  (a) the first rotor may be an outer rotor and the first stator may be an inner stator; and
  (b) the second rotor may be an inner rotor and the second stator may be an outer stator.

In any embodiment:
  (a) the first rotor comprises a first magnetic portion and the first stator comprises a first winding portion; and
  (b) the second rotor comprises a second magnetic portion and the second stator comprises a second winding portion.

In any embodiment, the first rotatable output shaft may rotate when the first motor is energized and the second rotatable output shaft may rotate when the second motor is energized.

In another aspect of this disclosure, which may be used by itself of with one or more of the other aspects disclosed herein, there is provided a method of energizing a fan assembly of a portable appliance, the fan assembly comprising a second motor having a second stator that is rotatably driven by a first rotatable output shaft of a first motor, the method comprising:
  (a) energizing the first motor; and,
  (a) subsequently energizing the second motor once the first rotatable output shaft of the first motor has commenced rotation,
whereby rotation produced by each of the first motor and the second motor is constructively combined.

In any embodiment, the second motor may be energized subsequent to the first rotatable output shaft of the first motor rotating at a minimum of 40%, 60% or 80% of its maximum rotational speed.

In any embodiment, the first rotatable output shaft of the first motor and a second rotatable output shaft of the second motor may each individually have a maximum rotational speed of at least 20,000 RPM and the second stator of the second motor may be mounted to the first rotatable output shaft of the first motor for rotation with the first rotatable output shaft of the first motor, and the method further may comprise energizing the first motor and rotating the first rotatable output shaft of the first motor and energizing the second motor and rotating the second rotatable output shaft of the second motor to at least 40,000 RPM.

In any embodiment, the fan assembly may be provided in an air flow passage of an appliance and the method may further comprise a user actuating the appliance whereupon the first motor is energized and the second motor is subsequently automatically energized whereupon the fan assembly produces an air flow in the air flow passage. Optionally, the first rotatable output shaft of the first motor and a second rotatable output shaft of the second motor may each individually have a maximum rotational speed of at least 20,000 RPM and the second stator of the second motor is mounted to the first rotatable output shaft of the first motor for rotation with the first rotatable output shaft of the first motor, and the method may further comprise energizing the first motor and rotating the first rotatable output shaft of the first motor and energizing the second motor and rotating the second rotatable output shaft of the second motor to at least 40,000 RPM.

In any embodiment, the appliance may be a surface cleaning apparatus and the air flow produced by the fan assembly is at least 15, 20, 25, 30 or more CFM in the surface cleaning apparatus.

In any embodiment, the appliance is a hair dryer and the air flow produced by the fan assembly is at least 25 CFM from the hair dryer.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
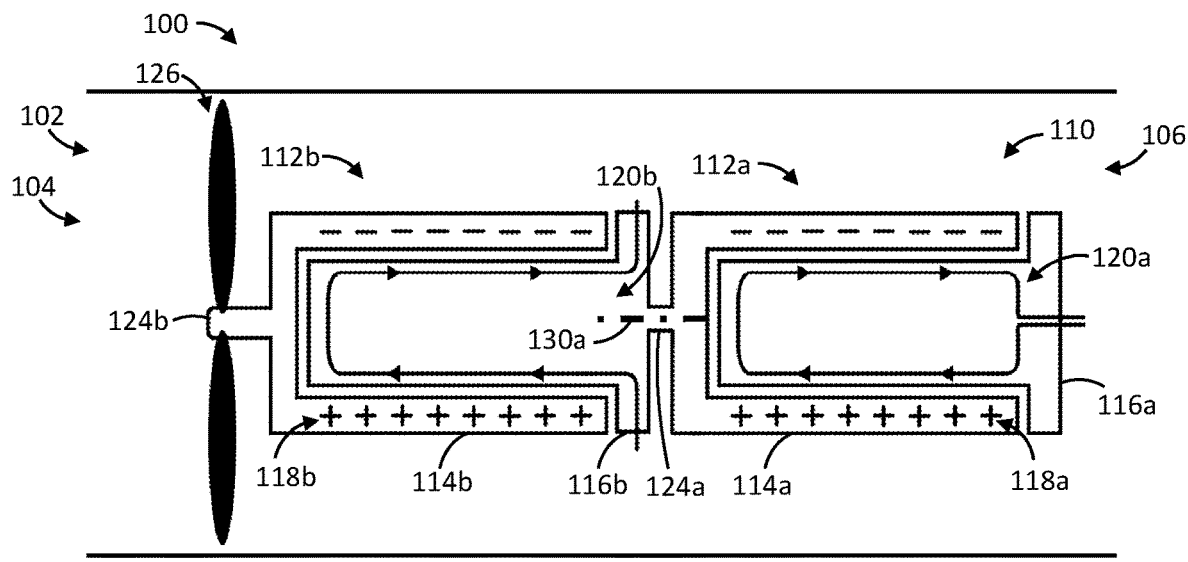
FIG. 1 is a schematic illustration of an appliance having a fan and motor assembly provided in an air flow passage.

The drawings included herewith are for illustrating various examples of articles, methods, and apparatuses of the teaching of the present specification and are not intended to limit the scope of what is taught in any way.

DESCRIPTION OF VARIOUS EMBODIMENTS

Various apparatuses will be described below to provide an example of an embodiment of each claimed invention. No embodiment described below limits any claimed invention and any claimed invention may cover apparatuses that differ from those described below. The claimed inventions are not limited to apparatuses having all of the features of any one apparatus described below or to features common to multiple or all of the apparatuses described below. It is possible that an apparatus described below is not an embodiment of any claimed invention. Any invention disclosed in an apparatus described below that is not claimed in this document may be the subject matter of another protective instrument, for example, a continuing patent application, and the applicants, inventors or owners do not intend to abandon, disclaim or dedicate to the public any such invention by its disclosure in this document.

The terms "an embodiment", "embodiment", "embodiments", "the embodiment", "the embodiments", "one or more embodiments", "some embodiments", and "one embodiment" mean "one or more (but not all) embodiments of the present invention(s)," unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Some elements herein may be identified by a part number, which is composed of a base number followed by an alphabetical or subscript-numerical suffix (e.g., 112a, or 1121). Multiple elements herein may be identified by part numbers that share a base number in common and that differ by their suffixes (e.g., 1121, 1122, and 1123). All elements with a common base number may be referred to collectively or generically using the base number without a suffix (e.g., 112).

It should be noted that terms of degree such as "substantially", "about", and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

General Description of a Fan and Motor Assembly

Described herein are motor arrangements that may be used to produce an air moving member (e.g., a suction motor). The motor arrangement may drive one or more impellers and/or propellers. For example, as exemplified herein, a series of motor units (a stator and a rotor) may have a drive shaft, such as an output shaft, having one or more impellers and/or propellers thereon.

FIG. 1 exemplifies an appliance 100 that have an air flow passage 102 with a fan and motor assembly 110 therein (which may also be referred to as a fan assembly). The fan assembly 110, as described subsequently, may improve the versatility, efficiency, and/or portability of the appliance 100. In some examples, the appliance 100 may be surface cleaning apparatus, such as an upright vacuum cleaner, a stick vacuum cleaner, a hand vacuum cleaner, a canister vacuum cleaner, a wet/dry vacuum cleaner or a carpet extractor. In other examples, the appliance 100 may be any one of a hair dryer, a hand dryer, and a room air cleaner (which could also be referred to as a room air purifier). Each appliance 100 may be corded and/or cordless (i.e., portable).

Referring now to FIG. 1, shown therein is an example of an appliance 100 having an air flow passage 102 that extends from and air inlet 104 to an air outlet 106. In the example illustrated, a fan assembly 110 is provided in the air flow passage 102 to urge air through the air flow passage 102.

Figure 2:
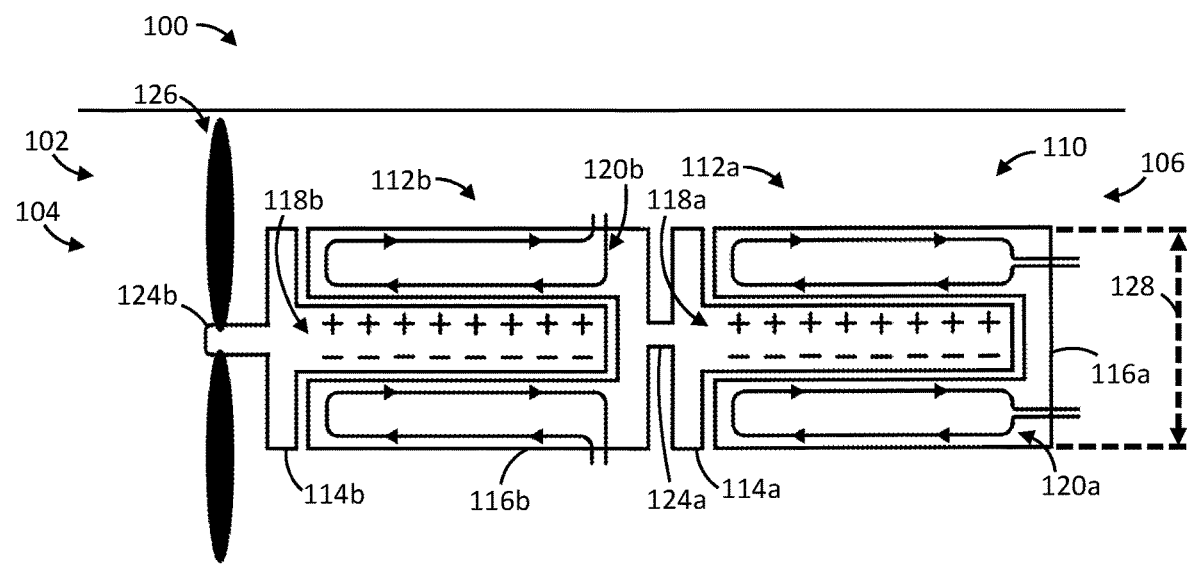
FIG. 2 is a schematic illustration of an appliance having an alternative embodiment of a fan and motor assembly provided in an air flow passage.
Figure 3A:
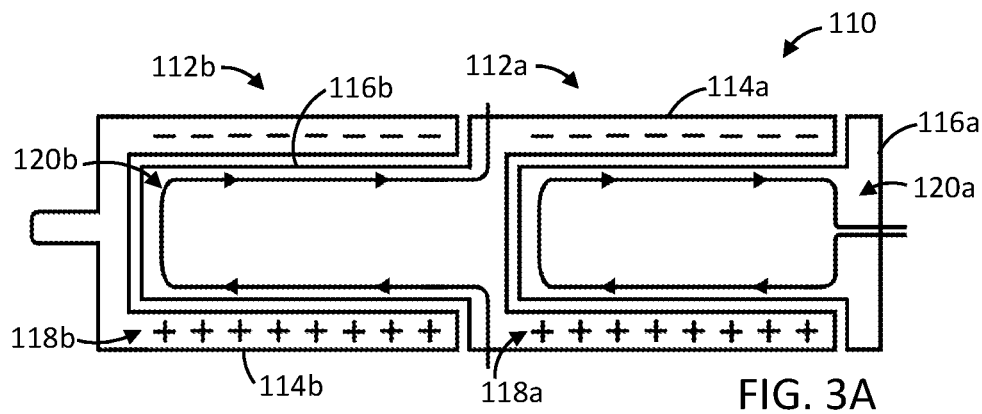
FIG. 3A is a schematic illustration of an alternative embodiment of a fan and motor assembly, wherein the fan and motor assembly includes a first motor having an inner stator comprising a first winding portion and an outer rotor comprising a first magnetic portion and a second motor having an inner stator comprising a second winding portion and an outer rotor comprising a second magnetic portion.
Figure 3B:
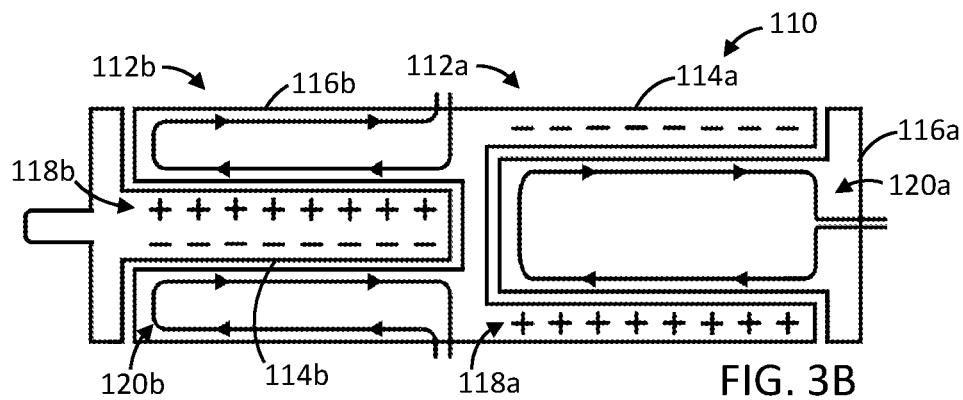
FIG. 3B is a schematic illustration of an alternative embodiment of a fan and motor assembly, wherein the fan and motor assembly includes a first motor having an inner stator comprising a first winding portion and an outer rotor comprising a first magnetic portion and a second motor having an outer stator comprising a second winding portion and an inner rotor comprising a second magnetic portion.
Figure 3C:
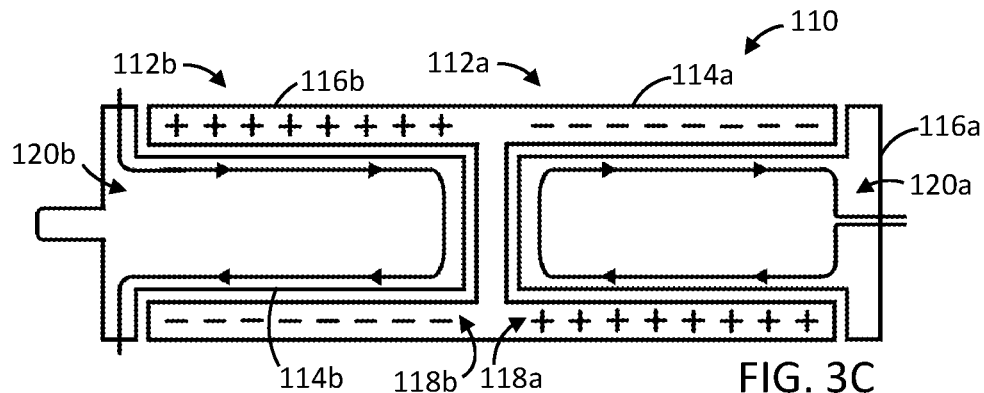
FIG. 3C is a schematic illustration of an alternative embodiment of a fan and motor assembly, wherein the fan and motor assembly includes a first motor having an inner stator comprising a first winding portion and an outer rotor comprising a first magnetic portion and a second motor having an outer stator comprising a second magnetic portion and an inner rotor comprising a second winding portion.
Figure 3D:
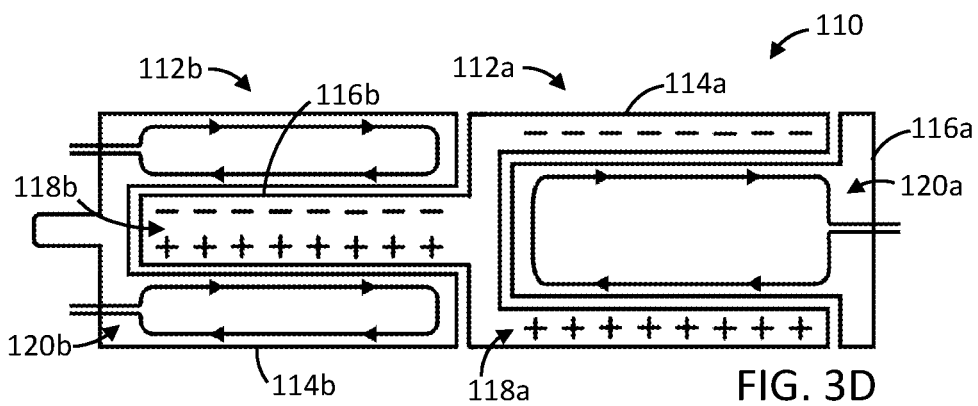
FIG. 3D is a schematic illustration of an alternative embodiment of a fan and motor assembly, wherein the fan and motor assembly includes a first motor having an inner stator comprising a first winding portion and an outer rotor comprising a first magnetic portion and a second motor having an inner stator comprising a second magnetic portion and an outer rotor comprising a second winding portion.
Figure 4A:
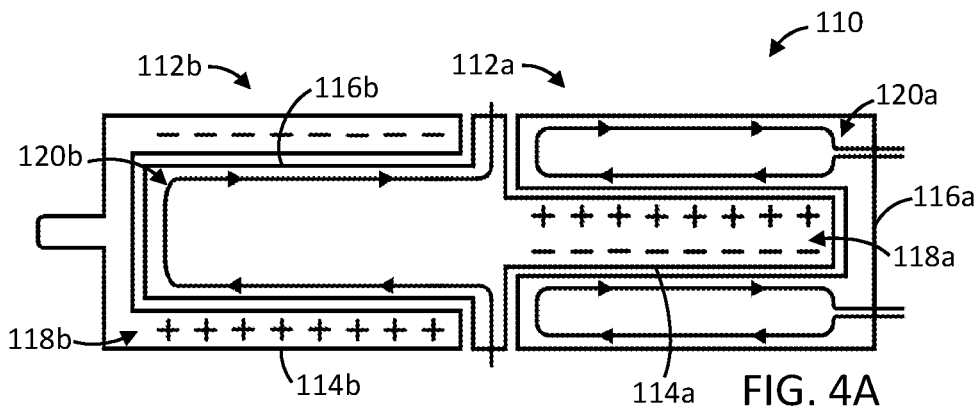
FIG. 4A is a schematic illustration of an alternative embodiment of a fan and motor assembly, wherein the fan and motor assembly includes a first motor having an outer stator comprising a first winding portion and an inner rotor comprising a first magnetic portion and a second motor having an inner stator comprising a second winding portion and an outer rotor comprising a second magnetic portion.
Figure 4B:
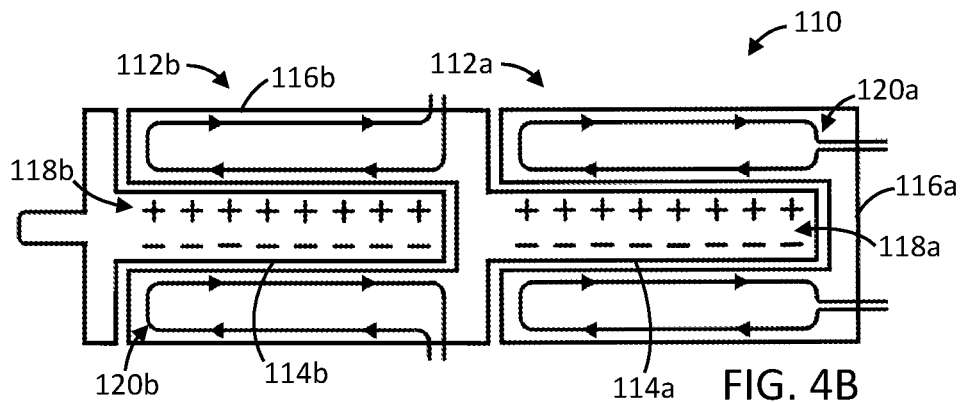
FIG. 4B is a schematic illustration of an alternative embodiment of a fan and motor assembly, wherein the fan and motor assembly includes a first motor having an outer stator comprising a first winding portion and an inner rotor comprising a first magnetic portion and a second motor having an outer stator comprising a second winding portion and an inner rotor comprising a second magnetic portion.
Figure 4C:
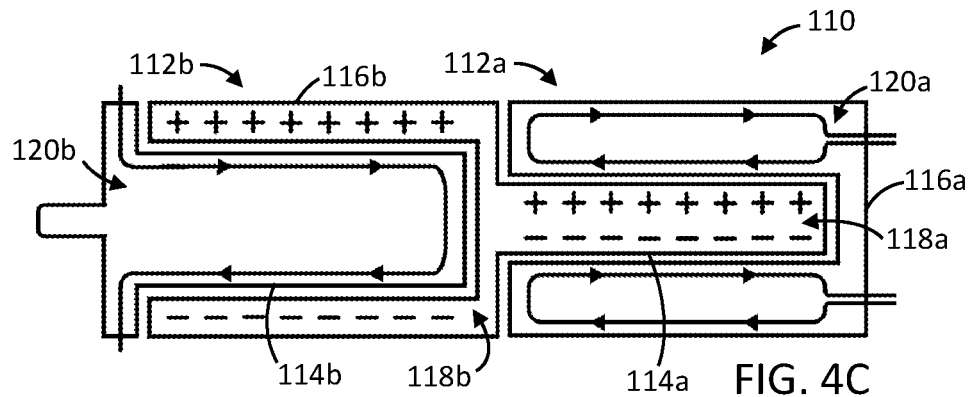
FIG. 4C is a schematic illustration of an alternative embodiment of a fan and motor assembly, wherein the fan and motor assembly includes a first motor having an outer stator comprising a first winding portion and an inner rotor comprising a first magnetic portion and a second motor having an outer stator comprising a second magnetic portion and an inner rotor comprising a second winding portion.
Figure 4D:
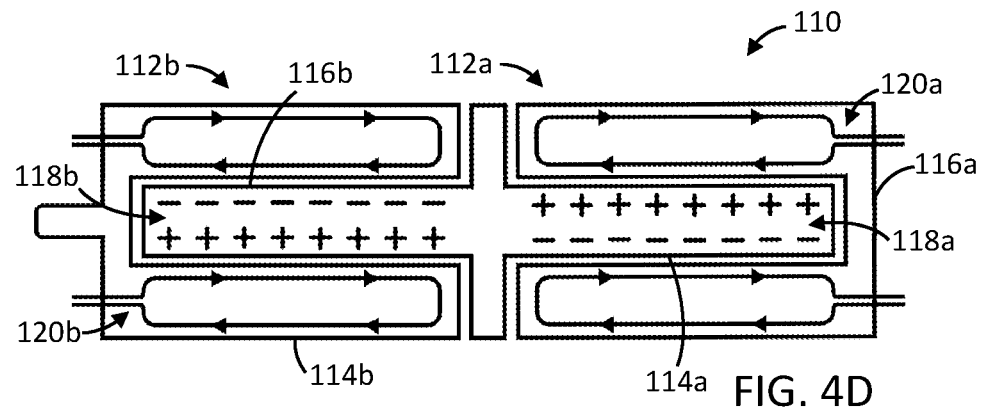
FIG. 4D is a schematic illustration of an alternative embodiment of a fan and motor assembly, wherein the fan and motor assembly includes a first motor having an outer stator comprising a first winding portion and an inner rotor comprising a first magnetic portion and a second motor having an inner stator comprising a second magnetic portion and an outer rotor comprising a second winding portion.
Figure 5A:
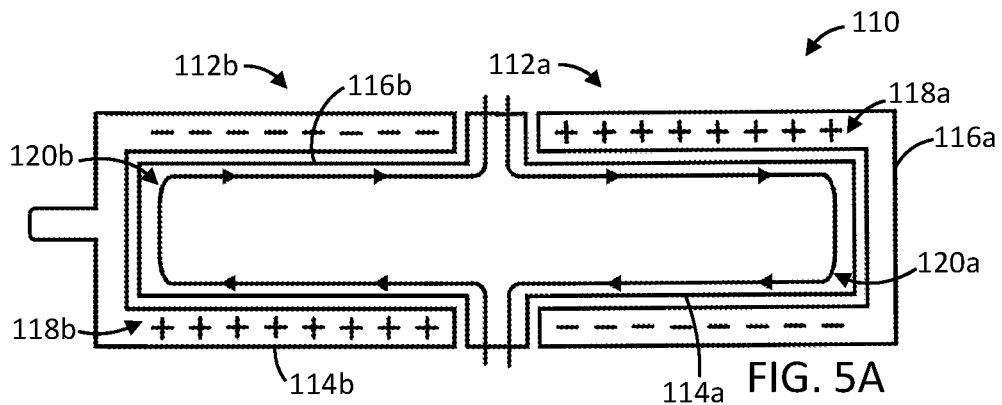
FIG. 5A is a schematic illustration of an alternative embodiment of a fan and motor assembly, wherein the fan and motor assembly includes a first motor having an outer stator comprising a first magnetic portion and an inner rotor comprising a first winding portion and a second motor having an inner stator comprising a second winding portion and an outer rotor comprising a second magnetic portion.
Figure 5B:
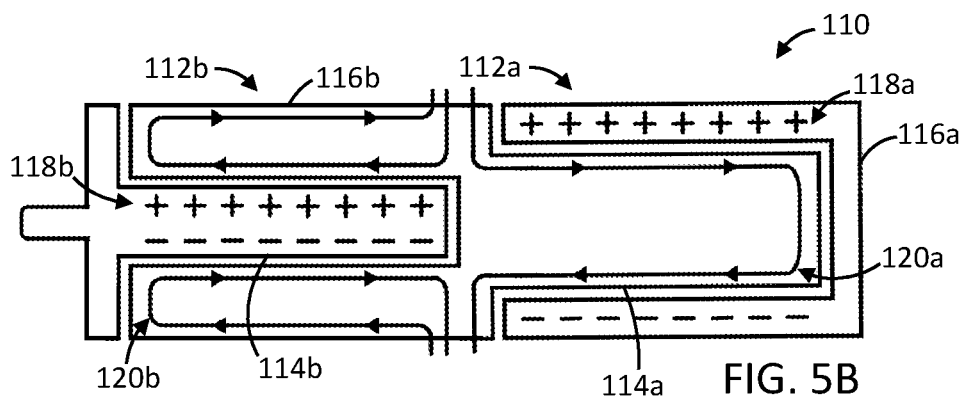
FIG. 5B is a schematic illustration of an alternative embodiment of a fan and motor assembly, wherein the fan and motor assembly includes a first motor having an outer stator comprising a first magnetic portion and an inner rotor comprising a first winding portion and a second motor having an outer stator comprising a second winding portion and an inner rotor comprising a second magnetic portion.
Figure 5C:
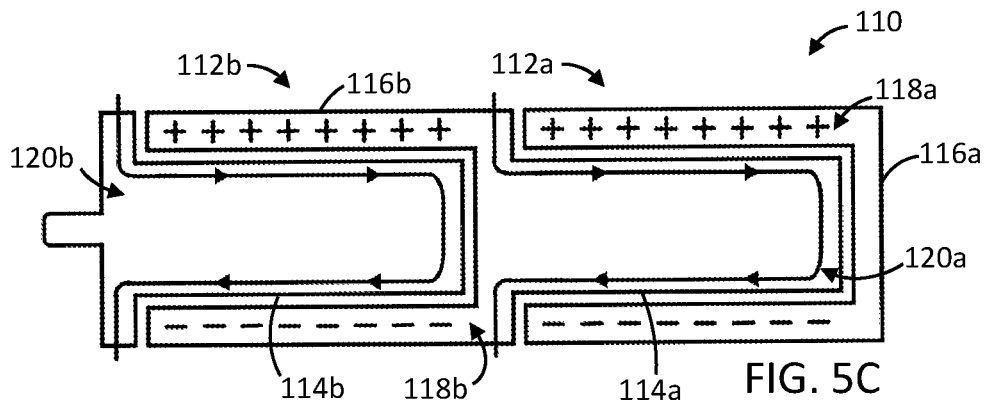
FIG. 5C is a schematic illustration of an alternative embodiment of a fan and motor assembly, wherein the fan and motor assembly includes a first motor having an outer stator comprising a first magnetic portion and an inner rotor comprising a first winding portion and a second motor having an outer stator comprising a second magnetic portion and an inner rotor comprising a second winding portion.
Figure 5D:
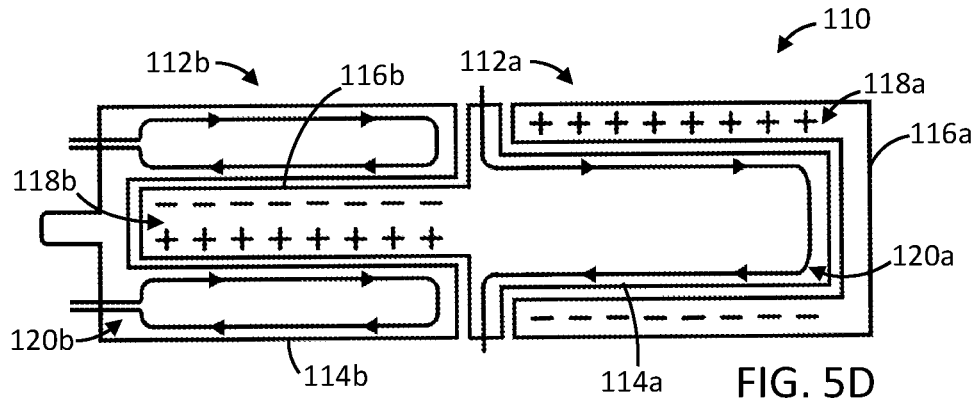
FIG. 5D is a schematic illustration of an alternative embodiment of a fan and motor assembly, wherein the fan and motor assembly includes a first motor having an outer stator comprising a first magnetic portion and an inner rotor comprising a first winding portion and a second motor having an inner stator comprising a second magnetic portion and an outer rotor comprising a second winding portion.
Figure 6A:
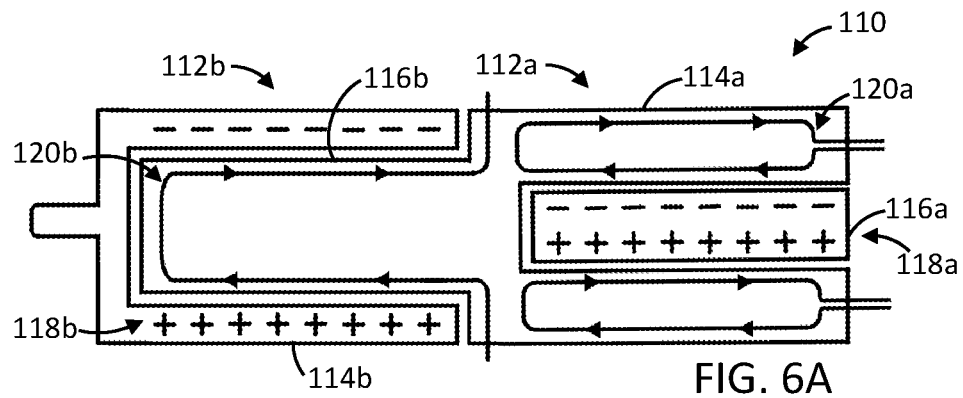
FIG. 6A is a schematic illustration of an alternative embodiment of a fan and motor assembly, wherein the fan and motor assembly includes a first motor having an inner stator comprising a first magnetic portion and an outer rotor comprising a first winding portion and a second motor having an inner stator comprising a second winding portion and an outer rotor comprising a second magnetic portion.
Figure 6B:
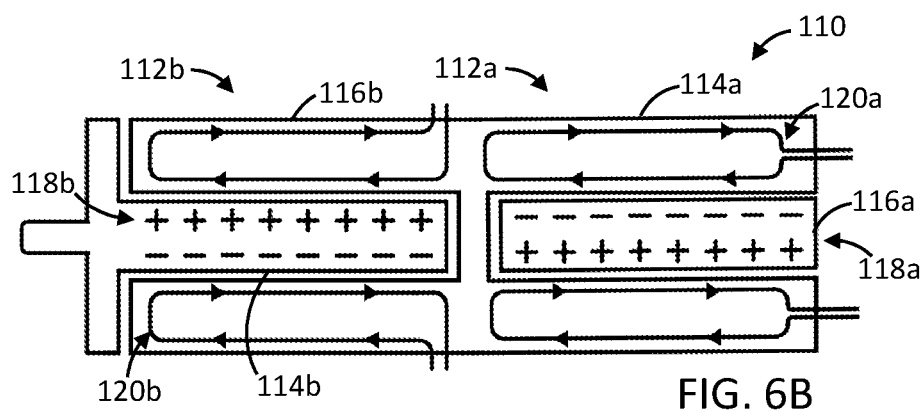
FIG. 6B is a schematic illustration of an alternative embodiment of a fan and motor assembly, wherein the fan and motor assembly includes a first motor having an inner stator comprising a first magnetic portion and an outer rotor comprising a first winding portion and a second motor having an outer stator comprising a second winding portion and an inner rotor comprising a second magnetic portion.
Figure 6C:
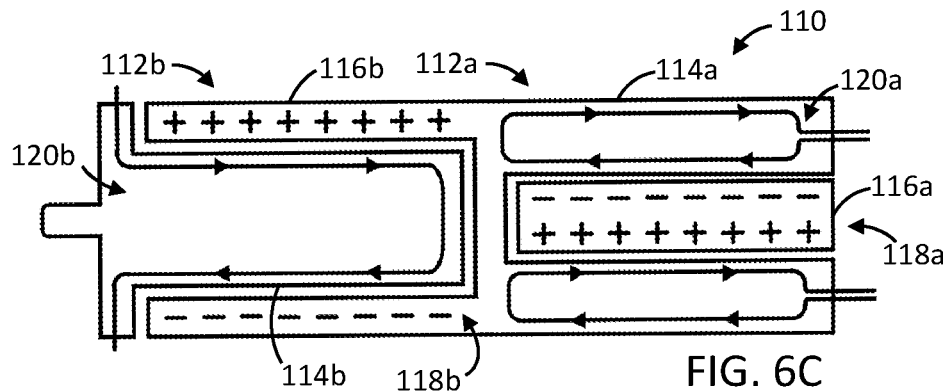
FIG. 6C is a schematic illustration of an alternative embodiment of a fan and motor assembly, wherein the fan and motor assembly includes a first motor having an inner stator comprising a first magnetic portion and an outer rotor comprising a first winding portion and a second motor having an outer stator comprising a second magnetic portion and an inner rotor comprising a second winding portion.
Figure 6D:
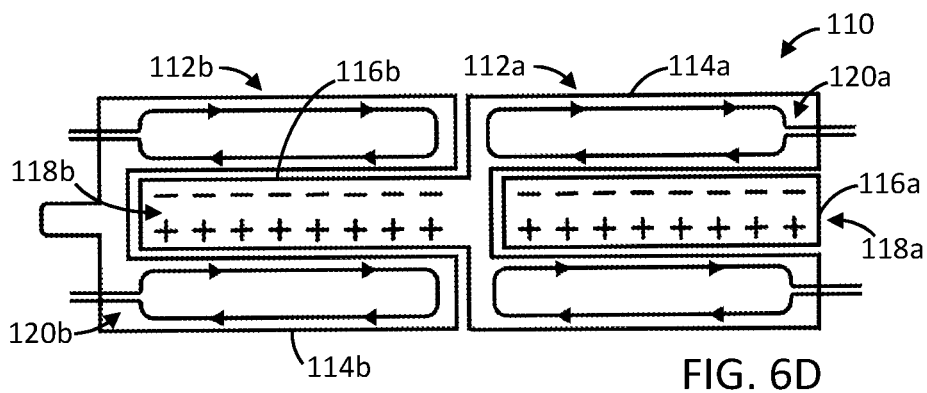
FIG. 6D is a schematic illustration of an alternative embodiment of a fan and motor assembly, wherein the fan and motor assembly includes a first motor having an inner stator comprising a first magnetic portion and an outer rotor comprising a first winding portion and a second motor having an inner stator comprising a second magnetic portion and an outer rotor comprising a second winding portion.

Still referring to FIG. 1, the fan assembly 110 has a first motor or motor unit 112*a* and a second motor or motor unit 112*b*. The first motor 112*a* includes a first rotor 114*a* and a first stator 116*a*. In the example illustrated, the first stator 116*a* is positioned within the first rotor 114*a*. That is, as shown in FIG. 1, the first stator 116*a* is an inner stator and the first rotor 114*a* is an outer rotor. Accordingly, the first motor 112*a* may be an outrunner motor. In other embodiments, see, for example FIG. 2, the first rotor 114*a* may be positioned within the first stator 116*a*. That is, as shown in FIG. 2, the first stator 116*a* is an outer stator and the first rotor 114*a* is an inner rotor. Accordingly, the second motor 112*b* may be an inrunner motor.

As understood in the art, the first rotor 114*a* comprises one of a first magnetic portion 118*a* or a first winding portion 120*a* and the first stator 116*a* comprises the other of the first magnetic portion 118*a* and the first winding portion 120*a*. Therefore, in accordance with the principles of electromagnetism, the first stator 116*a* can drive rotation of the first rotor 114*a* at a specified RPM (RPM of the first motor 112*a*). Referring to FIG. 1, in the example illustrated, the first rotor 114*a* comprises the first magnetic portion 118*a* and the first stator 116*a* comprises the first winding portion 120*a*.

The first motor 112*a* includes a first rotatable output shaft 124*a*. The first rotatable output shaft 124*a* is rotated by the first rotor 114*a* of the first motor 112*a*. That is, the first rotatable output shaft 124*a* is drivingly connected to the first rotor 114*a* and has an RPM equal to the RPM of the first rotor 114*a*.

Similar to the first motor 112*a*, the second motor 112*b* includes a second rotor 114*b* and a second stator 116*b*. In the example illustrated in FIG. 1, the second stator 116*b* is positioned within the second rotor 114*b* (i.e., the second stator 116*b* is an inner stator and the second rotor 114*b* is an outer rotor). In other embodiments, see, for example FIG. 2, the second rotor 114*b* may be positioned within the second stator 116*b* (i.e., the second rotor 114*b* may be an inner rotor and the second stator 116*b* may be an outer stator). The second rotor 114*b* comprises one of a second magnetic portion 118*b* or a second winding portion 120*b* and the second stator 116*b* comprises the other of the second magnetic portion 118*b* and the second winding portion 120*b*. Therefore, in accordance with the principles of electromagnetism, the second stator 116*b* can drive rotation of the second rotor 114*b* at a specified RPM (RPM of the second motor 112*b*). Referring to FIG. 1, in the example illustrated, the second rotor 114*b* comprises the second magnetic portion 118*b* and the second stator 116*b* comprises the second winding portion 120*b*.

The second motor 112*b* includes a second rotatable output shaft 124*b*. The second rotatable output shaft 124*b* is rotated by the second rotor 114*b* of the second motor 112*b*. That is, the second rotatable output shaft 124*b* is drivingly connected to the second rotor 114*b* and has an RPM equal to the RPM of the second rotor 114*b*.

As shown in FIG. 1, the second rotatable output shaft 124*b* may be drivingly connected to a fan blade 126. Depending on the desired characteristics of the appliance 100, the fan blade 126 may be either an impeller or a propeller.

As shown in FIG. 1, the second stator 116*b* of the second motor 112*b* may be drivingly connected to the first rotor 114*a* of the first motor 112*a*. Specifically, the first rotatable output shaft 124*a* of the first motor 112*a* may connect the first rotor 114*a* to the second stator 116*b*. Accordingly, when in use, the second stator 116*b* may rotate at an RPM equal to the RPM of the first motor 112*a*. In the example illustrated in FIGS. 1 and 2, the first rotatable output shaft 124*a* may be a separately manufactured shaft member that extends from and is attached to the first rotor 114*a*. In other examples, see for example FIGS. 3A to 6D, the first rotatable output shaft 124*a* of the first motor 112*a* is not a distinct component of the first motor 112*a*. That is, the first rotatable output shaft 124*a* of the first motor 112*a* may be integrally formed as part of a portion of the first motor 112*a* that connects to the second stator 116*b* of the second motor 112*b* (e.g., the core of stator 114*a* as exemplified in FIGS. 1 and 2).

An advantage of this configuration is that the output of each motor or motor unit may be added to each other to produce a fan assembly 110 that has an output shaft with a higher rate or rotation than could be achieved by either motor or motor unit operating independently. Accordingly, using the first rotor 114*a* to rotate the second stator 116*b*, while operating the second stator 116*b* to rotate the second rotor 114*b*, enables the second rotatable output shaft 124*b* to rotate at an RPM equal to the RPM of the first motor 112*a* plus the RPM of the second motor 112*b*. That is, for example, if the first motor 112*a* rotates the first rotatable output shaft 124*a* at, e.g., 35,000 RPM and the second motor 112*b* rotates the second rotatable output shaft 124*b* at, e.g., 35,000 RPM, by connecting the second stator 116*b* to the first rotor 114*a*, the second rotatable output shaft 124*b* may effectively rotate at 70,000 RPM. It will be appreciated that the first motor 112*a* may rotate the first rotatable output shaft 124*a* at 10,000-50,000; 15,000-45,000; 20,000-40,000; 25,000-35,000 RPM or any range encompassed therewithin and/or the second motor 112*b* may rotate the second rotatable output shaft 124*b* at 10,000-50,000; 15,000-45,000; 20,000-40,000; 25,000-35,000 RPM or any range encompassed therewithin.

A fan assembly 110 having connected first and second motors 112*a*, 112*b* can be designed to have a smaller diameter (see 128 in FIG. 2) and/or a lower dB level (i.e., are quieter) than equivalent motors (i.e., same RPM of the fan blade 126) that are known in the art. Accordingly, for example, while a hair dryer may have a single motor (rotor and stator assembly) which can drive an impeller at 70,000 RPM, such motors may produce a high pitched whine which is unpleasant. Further, while such a motor may be provided with sound insulation, this increases the weight, cost and bulk of the appliance. Alternately, if a quieter high speed single motor is used, this may increase the cost and/or weight of the appliance. Using a plurality (two or more) of motor units in series (i.e., ganged in series) as exemplified herein enables the use of low cost, relatively lower speed, commonly available motors to be used while producing a fan assembly 110 that has a relatively higher outlet speed.

Although the figures show the magnetic portions 118*a*, 118*b* comprising a single pair of magnets, and show the winding portions 120*a*, 120*b* comprising a single wire (i.e., armature loop), this is for illustrative purposes only. It is to be understood that any number of armatures loops having any number of wires and any number of magnets may be used. Further, it is to be understood that the first motor 112a and the second motor 112b can be brushed or brushless.

While FIGS. 1 and 2 show example configurations of a dual motor fan assembly 110; other configurations may be implemented. That is, the first motor 112a may have anyone of the following configurations: (a) a first stator 116a comprising a first winding portion 120a and a first rotor 114a comprising a first magnetic portion 118a wherein the first stator 116a is an inner stator the first rotor 114a is an outer rotor (see FIGS. 3A to 3D); (b) a first stator 116a comprising a first winding portion 120a and a first rotor 114a comprising a first magnetic portion 118a wherein the first rotor 114a is an inner rotor and the first stator 116a is an outer stator (see FIGS. 4A to 4D); (c) a first stator 116a comprising a first magnetic portion 118a and a first rotor 114a comprising a first winding portion 120a wherein the first rotor 114a is an inner rotor and the first stator 116a is an outer stator (see FIGS. 5A to 5D); or (d) a first stator 116a comprising a first magnetic portion 118a and a first rotor 114a comprising a first winding portion 120a wherein the first stator 116a is an inner stator and the first rotor 114a is an outer rotor (see FIGS. 6A to 6D).

Similarly, the second motor 112b may have any one of the following configurations: (a) a second stator 116b comprising a second winding portion 120b and a second rotor 114b comprising a second magnetic portion 118b wherein the second stator 116b is an inner stator and the second rotor 114b is an outer rotor (see FIGS. 3A, 4A, 5A, and 6A); (b) a second stator 116b comprising a second winding portion 120b and a second rotor 114b comprising a second magnetic portion 118b wherein the second rotor 114b is an inner rotor and the second stator 116b is an outer stator (see FIGS. 3B, 4B, 5B, and 6B); (c) a second stator 116b comprising a second magnetic portion 118b and a second rotor 114b comprising a second winding portion 120b wherein the second rotor 114b is an inner rotor and the second stator 116b is an outer stator (see FIGS. 3C, 4C, 5C, and 6C); or (d) a second stator 116b comprising a second magnetic portion 118b and a second rotor 114b comprising a second winding portion 120b wherein the second stator 116b is an inner stator and the second rotor 114b is an outer rotor (see FIGS. 3D, 4D, 5D, and 6D).

In each of the examples illustrated in FIGS. 1 to 6D, the first rotatable output shaft 124a has a longitudinal axis 130a (see FIG. 1) and the second motor 112b is axially spaced from the first motor 112a.

Figure 7:
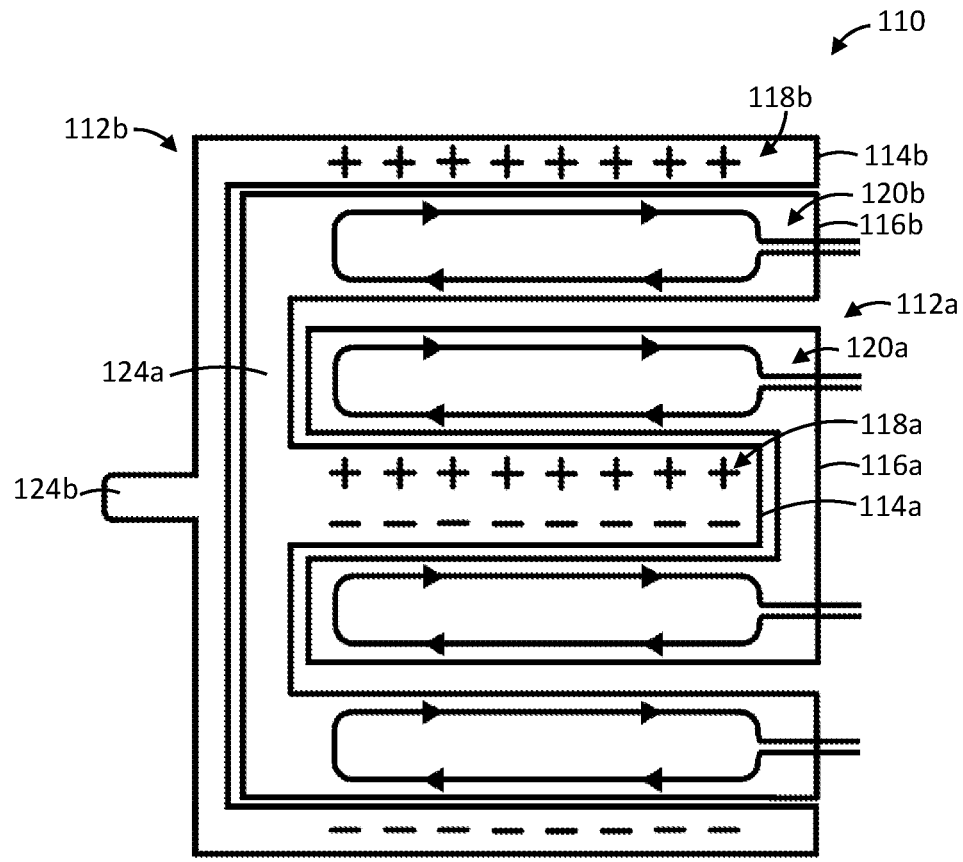
FIG. 7 is a schematic illustration of an alternative embodiment of a fan and motor assembly, wherein a first motor and a second motor of the fan and motor assembly are nested.

Referring now to FIG. 7, the first and second motors 112a, 112b of the fan assembly 110 may be nested. When nested, the first motor 112a may be in any configuration, as described above, and the second motor 112b may be in any configuration, as described above. In the example illustrated, the first motor 112a includes a first stator 116a comprising a first winding portion 120a and a first rotor 114a comprising a first magnetic portion 118a; and the second motor 112b includes a second stator 116b comprising a second winding portion 120b and a second rotor 114b comprising a second magnetic portion 118b.

Figure 8:
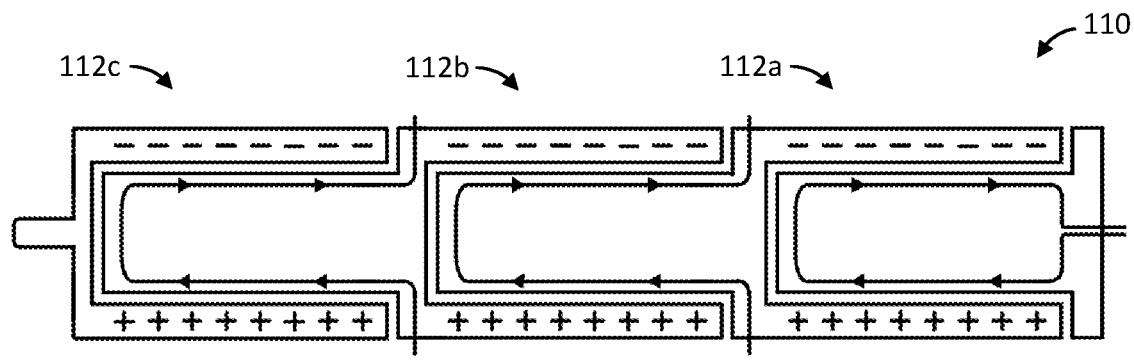
FIG. 8 is a schematic illustration of an alternative embodiment of a fan and motor assembly, wherein the fan and motor assembly includes a first motor, a second motor, and a third motor; and, FIG. 9 is a schematic illustration of an alternative embodiment of a fan and motor assembly, wherein a first motor and a second motor of the fan assembly are disengageable.

It will be appreciated that the fan assembly 110 may include more than two motors. For example, as exemplified in FIG. 8, the fan assembly 110 may include a first motor 112a, a second motor 112b, and a third motor 112c. When the fan assembly 110 includes n number of motors, the effective RPM of the rotatable output shaft of the nth motor will be the sum of the RPM values of each of motors one to n.

It will be appreciated that one or more of the motors 112a, 112b, 112c, etc. may be fully nested or partially nested.

General Description of a Disengageable Multi Fan Assembly

In accordance with one aspect of this disclosure, which may be used by itself or in combination with any other aspect of this disclosure, the first rotatable output shaft 124a of the first motor 112a may be disengageable from the second motor 112b.

The first rotatable output shaft 124a of the first motor 112a may disengage from the second motor 112b by any means known in the art. For example, the first rotatable output shaft 124a may be extendable and retractable. Alternatively, the entire first motor 112a may be movable in an axial direction with respect to the second motor 112b, or vice versa. Alternately or in addition, a clamping mechanism may be used to selectively engage and disengage the first rotatable output shaft 124a from the second stator 116b of the second motor 112b.

Figure 9:
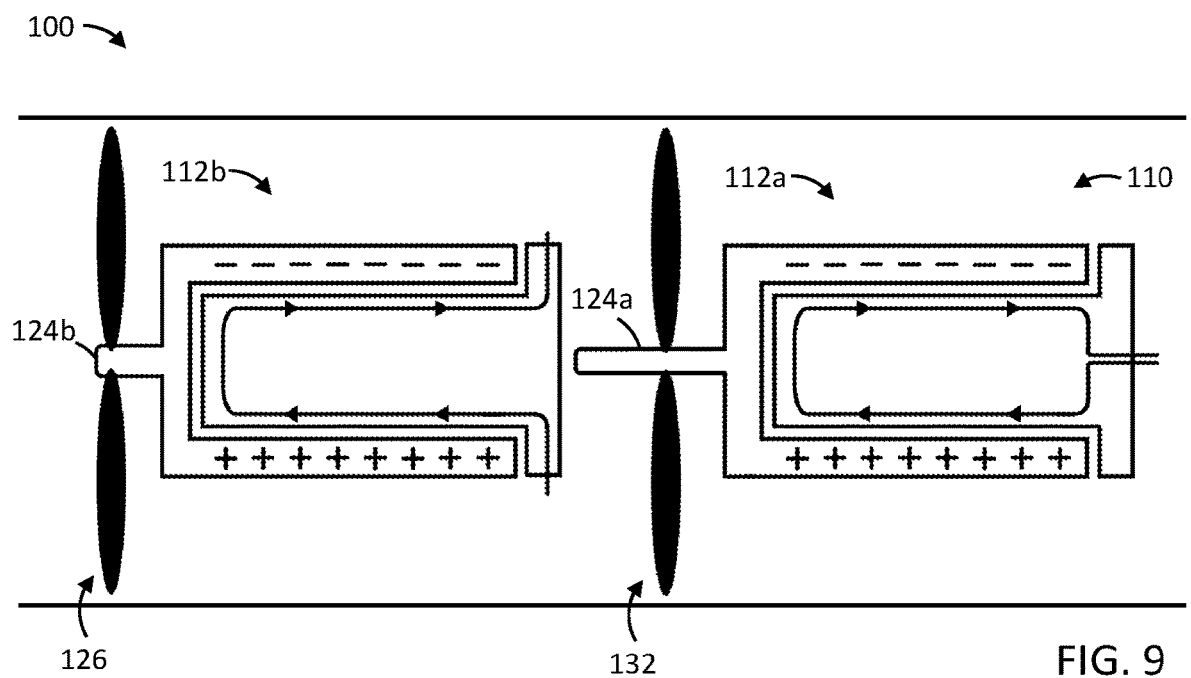

FIG. 9 exemplified an example of an appliance 100 having a fan assembly 110 that includes a second motor 112b that is disengageable from the first motor 112a.

Disengaging the second motor 112b from the first rotatable output shaft 124a allows for the second motor 112b to rotate the second rotatable output shaft 124b at the RPM of the second motor 112b without any efficiency losses that may be associated with rotating the engaged first rotatable output shaft 124a. Put another way, although the second motor 112b may be operable while engaged to the first motor 112a with the first motor 112a in a stationary (i.e., "off") state, the engagement of the second motor 112b to the first rotatable output shaft 124a may decrease the efficiency of the second motor 112b.

General Description of a Multiple Fan Blade Assembly

In accordance with one aspect of this disclosure, which may be used by itself or in combination with any other aspect of this disclosure, a plurality of fan blades may be provided. Accordingly, for example, the first rotatable output shaft 124a may comprise a second fan blade 132. This aspect may be used by itself or with one or more of the other aspects set out herein. Accordingly, this aspect may be used with an embodiment wherein the motors are disengageable, e.g., the first rotatable output shaft 124a of the first motor 112a may be disengageable from the second motor 112b.

It will be appreciated that the output shaft of each motor 112a, 112b, aa2c, etc. may have one or more fan blades and that each fan blade may be the same or different. Accordingly, for example, the second fan blade 132 may have the same or different characteristics as the fan blade 126 connected to the second rotatable output shaft 124b. For example, in some embodiments, the fan blade 126 connected to the second rotatable output shaft 124b may have one or more of a different number of fan blades, different radial length of fan blades, different inclination of fan blades, etc. Alternately, or in addition, one or more of the fan blades may be a propeller and one or more of the fan blades may be an impeller. Accordingly, for example, the fan blade 126 connected to the second rotatable output shaft 124b may be an impeller whereas the second fan blade 132 connected to the first rotatable output shaft 124a may be a propeller.

It may be desirable to have a fan assembly 110 that comprises a propeller and an impeller as each have their own operating characteristics. Accordingly, the appliance 100 may be optimizable for two functions. For example, it may be desirable to include an impeller on the second rotatable output shaft 124b as impellers may have high seal suction at high RPM. Further, it may be desirable to include a propeller on the first rotatable output shaft 124a as propellers provide high flow volume per watt (i.e., can be operated at lower RPM).

Optionally, in accordance with the description above, the first rotatable output shaft 124a may be disengageable from the second motor 112b. Accordingly, the second fan blade 132 of the first rotatable output shaft 124a may be operated independent of the fan blade 126 of the second rotatable output shaft 124b.

Further, in some embodiments, the second fan blade 132 of the first rotatable output shaft 124a may be disengageable from the first rotatable output shaft 124a so the fan blade 126 of the second rotatable output shaft 124b may be operated independent of the second fan blade 132 of the first rotatable output shaft 124a, while the first rotatable output shaft 124a is engaged to the second motor 112b.

Any means known in the art may be used to engage and disengage the second fan blade 132 of the first rotatable output shaft 124a from the first rotatable output shaft 124a. For example, a slip ring may be used so that the second fan blade 132 of the first rotatable output shaft 124a is engaged to the first rotatable output shaft 124a when the first motor 112a rotates in, for example, the clockwise direction, and is disengaged from the first rotatable output shaft 124a when the first motor 112a rotates in, for example, the counterclockwise direction.

General Description of a Method of Energizing a Fan Assembly

In accordance with one aspect of this disclosure, which may be used by itself or in combination with any other aspect of this disclosure, there is a method of energizing the fan assembly 110 of a portable appliance 100. This aspect may be used by itself or with one or more of the other aspects set out herein.

In examples of the fan assembly 110 that include a second motor 112b having a second stator 116b that is rotatably driven by a first rotatable output shaft 124a of a first motor 112a, a method of energizing the fan assembly 110 may include the steps of (a) energizing the first motor 112a; and (b) subsequently energizing the second motor 112b once the first rotatable output shaft 124a has commenced rotation. As described above, rotation produced by each of the first and second motors 112a, 112b is constructively combined.

For example, in some embodiments, the first rotatable output shaft 124a of the first motor 112a may be rotatable by the first motor 112a to at least 20,000 RPM and the second rotatable output shaft 124b of the second motor 112b may be rotatable by the second motor 112b to at least 20,000 RPM. Accordingly, when the second motor 112b, specifically the second stator 116b of the second motor 112b, is mounted to the first rotatable output shaft 124a of the first motor 112a, the second rotatable output shaft 124b of the second motor 112b may be rotated to at least 40,000 RPM.

In some exemplary methods, the second motor 112b may not be energized until the first rotatable output shaft 124a of the first motor 112a is rotating at a minimum of 40%, 50%, 60%, 70%, 80%, 90% or 100% of a maximum rotational speed of the first motor 112a.

As described above, the fan assembly 110 may be provided in an air flow passage 102 of an appliance 100. Accordingly, the method for energizing the fan assembly 110 may include the step of a user actuating the appliance 100 whereupon the first motor 112a is energized and the second (driven) motor 112b is subsequently automatically energized so that the fan assembly 110 produces an air flow in the air flow passage 102.

In some examples, the appliance 100 may be a surface cleaning apparatus and the fan assembly 110 may produce an air flow of at least 10, 15, 20, 25, 30, 35, 40, 45, 50, 55, 60, 65 70 or more CFM in the surface cleaning apparatus. In other examples, the appliance 100 may be a hair dryer and the fan assembly 110 may produce an output air flow of at least 10, 15, 20, 25, 30, 35, 40, 45, 50, 55, 60, 65 70 or more CFM from the hair dryer. Such air flow rates may be achieved using a smaller diameter fan blade and may therefore enable the use of a smaller diameter fan and motor assembly.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

What is claimed is:

1. A fan assembly comprising a plurality of nested components comprising:
   (a) a first stator;
   (b) a first rotor that is radially spaced from the first stator, wherein the first rotor is magnetically driven by the first stator to rotate with a first rotational speed relative to the first stator, the first rotor includes a second stator whereby the second stator rotates with the first rotor;
   (c) a second rotor that is radially spaced from the second stator, wherein the second rotor is magnetically driven by the second stator to rotate with a second rotational speed relative to the second stator; and,
   (d) a fan blade drivingly connected to the second rotor; wherein the fan assembly is operable to drive the fan blade at a third rotational speed that is defined by constructively combining the first rotational speed of the first rotor with the second rotational speed of the second rotor, wherein the third rotational speed is greater than each of the first rotational speed and the second rotational speed.

2. The fan assembly of claim 1 wherein the second stator is located radially outwardly from the first rotor.

3. The fan assembly of claim 2 wherein the second rotor is located radially outwardly from the second stator.

4. The fan assembly of claim 1 wherein the second rotor is located radially outwardly from the second stator.

5. The fan assembly of claim 1 wherein the first rotor rotates about an axis of rotation and the second rotor also rotates about the axis of rotation.

6. The fan assembly of claim 1 wherein the first rotor rotates about an axis of rotation, the first rotor has an axially extending first rotor outer face and the first stator has an axially extending first stator outer face that is spaced from and faces the first rotor outer face.

7. The fan assembly of claim 6 wherein the second rotor has an axially extending second rotor outer face and the second stator has an axially extending second stator outer face that is spaced from and faces the second rotor outer face.

8. The fan assembly of claim 7 wherein the second rotor outer face is radially outwardly spaced from the second stator outer face.

9. An assembly comprising a first motor at least partially nested in a second motor wherein:
   (a) the first motor comprises a first rotor and a first stator; and,
   (b) the second motor comprises a second rotor and a second stator,
   wherein the first rotor rotates about an axis of rotation; and a plane, that is transverse to the axis of rotation, extends through the first rotor, the second stator and the second rotor;
   wherein the second rotor is located radially outwardly from the second stator.

10. The assembly of claim 9 wherein the first rotor includes the second stator whereby the second stator concurrently rotates with the first rotor.

11. The assembly of claim 9 wherein the second stator is located radially outwardly from the first rotor.

12. The assembly of claim 9 wherein the second rotor also rotates about the axis of rotation.

13. The assembly of claim 9 wherein the first rotor has an axially extending first rotor outer face and the first stator has an axially extending first stator outer face that is spaced from and faces the first rotor outer face.

14. The assembly of claim 13 wherein the second rotor has an axially extending second rotor outer face and the second stator has an axially extending second stator outer face that is spaced from and faces the second rotor outer face.

15. The assembly of claim 14 wherein the second rotor outer face is radially outwardly spaced from the second stator outer face.

16. An assembly comprising a first motor at least partially nested in a second motor wherein:
   (a) the first motor comprises a first rotor and a first stator; and,
   (b) the second motor comprises a second rotor and a second stator, wherein the first rotor includes the second stator whereby the second stator rotates concurrently with the first rotor.

17. The assembly of claim 16 wherein the first rotor rotates about an axis of rotation and a plane that is transverse to the axis of rotation extends through the first rotor, the second stator and the second rotor.

18. The assembly of claim 17 wherein the plane also extends through the first stator.

* * * * *